United States Patent
Mao

Patent Number: 5,759,719
Date of Patent: Jun. 2, 1998

[54] ELECTRODE MATERIAL FOR LITHIUM INTERCALATION ELECTROCHEMICAL CELLS

[75] Inventor: Zhenhua Mao, Duluth, Ga.

[73] Assignee: Motorola, Inc., Schaumburg, Ill.

[21] Appl. No.: 944,059

[22] Filed: Sep. 27, 1997

Related U.S. Application Data

[63] Continuation of Ser. No. 579,179, Dec. 27, 1995, abandoned.

[51] Int. Cl.⁶ .................................................. H01M 4/52
[52] U.S. Cl. ............................................ 429/223; 429/218
[58] Field of Search .............................. 429/218; 422/223

[56] References Cited

U.S. PATENT DOCUMENTS

| | | | |
|---|---|---|---|
| 4,340,652 | 7/1982 | Raistrick et al. | 429/112 |
| 5,264,201 | 11/1993 | Dahn et al. | 423/594 |
| 5,378,560 | 1/1995 | Tomiyama | 429/217 |
| 5,429,890 | 7/1995 | Pynenburg et al. | 429/192 |

FOREIGN PATENT DOCUMENTS

0556555A1  1/1993  European Pat. Off. ......... H01M 4/48

OTHER PUBLICATIONS

Dahn et al., Structure and Electrochemistry of Li1−xNiO2 and a new Li2NiO2 Phase with the Ni(OH)2 Structure, Solid State Ionics, 44 (1990) 87–97 (no month available), 1990.

Chemistry Express, vol. 6, No. 3, pp. 161–164 (1991) Synthesis and Characterization of LiNiO$_2$, Ohzyki, et al (no month available).

Electrochemistry & Structural Chemistry ofLiNiO$_2$(R3m) for 4 Volt Secondary Lithium Cells, Ohzuku, et al, J. Electrochem Soc. vo. 140, No. 7, Jul. 1993.

Lithium Batteries New Materials, Developments and Perspectives, Co. Pistoia Editor, Elsevier, NY 1994 (no month available).

Solid State Ionics 69 (1994) 59–67, Improved capacity retention in rechargeable 4V lithium/lithium–manganese oxide (spinel cells, Thackeray, et al 1994 Elsevier Science B.B. (no month available).

Preparation of High Surface Area EMD and 3–Volt Cathode of Manganese Oxides, M. Yoshio, Saga Univ. IBA New Orleans Mtg. Oct. 9, 1993.

*Primary Examiner*—Stephen Kalafut
*Assistant Examiner*—Carol Chaney
*Attorney, Agent, or Firm*—Felipe J. Farley; Kelly A. Gardner

[57] ABSTRACT

An electrode material for use in an lithium intercalation electrochemical cell. The electrode material is an Li$_2$NiO$_2$ material which may be used either alone, or in combination with conventional lithiated transition metal oxide materials. The electrode material provides a reservoir or excess pool of lithium ions adapted to overcome the irreversible capacity loss typically experienced in current lithium ion batteries.

13 Claims, 5 Drawing Sheets

5,759,719

1

ELECTRODE MATERIAL FOR LITHIUM INTERCALATION ELECTROCHEMICAL CELLS

This is a Continuation of U.S. patent application Ser. No. 08/579,179 filed on Dec. 27, 1995, abandoned Sep. 26, 1997 entitled ELECTRODE MATERIAL FOR LITHIUM INTERCALATION ELECTROCHEMICAL CELLS, and assigned to Motorola, Inc.

TECHNICAL FIELD

This invention relates in general to electrodes and electrode materials for electrochemical cells, and in particular to electrode materials which are adapted to serve as the cathode in lithium intercalation electrochemical cells.

BACKGROUND OF THE INVENTION

Numerous transition metal oxide materials have been investigated intensively during the past decade for use as the positive electrode or cathode in a rechargeable lithium ion and lithium polymer batteries. These materials have been investigated because of their gravimetric energy density. Exemplary transition metal oxides include compounds as $V_2O_5$, $V_6O_{13}$, $TiO_2$, $MnO_2$, $LiCoO_2$, $LiMn_2O_4$, and $LiNiO_2$, to name but a few. Such materials may be combined with negative electrode or anode materials to form electrochemical battery cells. Preferred anode materials depend upon the cathode material selected, and include for example, metallic lithium, lithium alloys, and lithium intercalation materials such as graphite. Alternatively, amorphous carbon based materials such as those disclosed in commonly assigned, copending U.S. patent application Ser. No. 08/534,427 filed Sep. 27, 1995 disclose novel materials which may be employed as the anode in the cells.

Unfortunately, the use of carbon materials as the negative electrode material or anode presents challenges to the designers of electrochemical cells. The initial charge of carbon materials involves formation of electrochemical interfacial films on the carbon particles. This process results in a significant irreversible capacity loss in the cell. Since the charge for this irreversible capacity must come from the positive electrodes, overall capacity of a cell is reduced significantly by the irreversible capacity loss experienced during the first charge and discharge cycle. As an example, if the reversible capacity of a material is approximately 300 mAh/g, but it's irreversible capacity loss is 120 mAh/g, then 420 mAh/g, is required to charge one gram of anode material for a usable capacity of 300 mAh. To match the negative capacity, it therefore requires approximately 3.5 g. of cathode material for each gram of anode material if the capacity of cathode material is approximately 120 mAh/g.

The need for excess capacity in the cathode so as to overcome the irreversible capacity loss of the anode increases substantially the size, weight, and cost of lithium batteries. Accordingly, it would be desirable if an additional lithium ion source could be put into the positive material and transferred to the anode in order to compensate for the initial irreversible capacity loss. In this way, overall capacity could be significantly improved without deleteriously affecting the size, weight and cost of the cell.

Accordingly, there exists a need for an electrode material which can provide an excess well or reservoir of lithium ions for overcoming the significant irreversible capacity loss experienced by anode materials in lithium intercalation cells. The electrode material must be electrochemically active after the first cycle so as to not degrade the perfor-

2 mance of the overall cell into which it is incorporated. Moreover, the electrode material must be composed of materials that are electrochemically stable in the presence of the other components of the cell.

DETAILED DESCRIPTION OF THE PREFERRED EMBODIMENT

Figure 1:
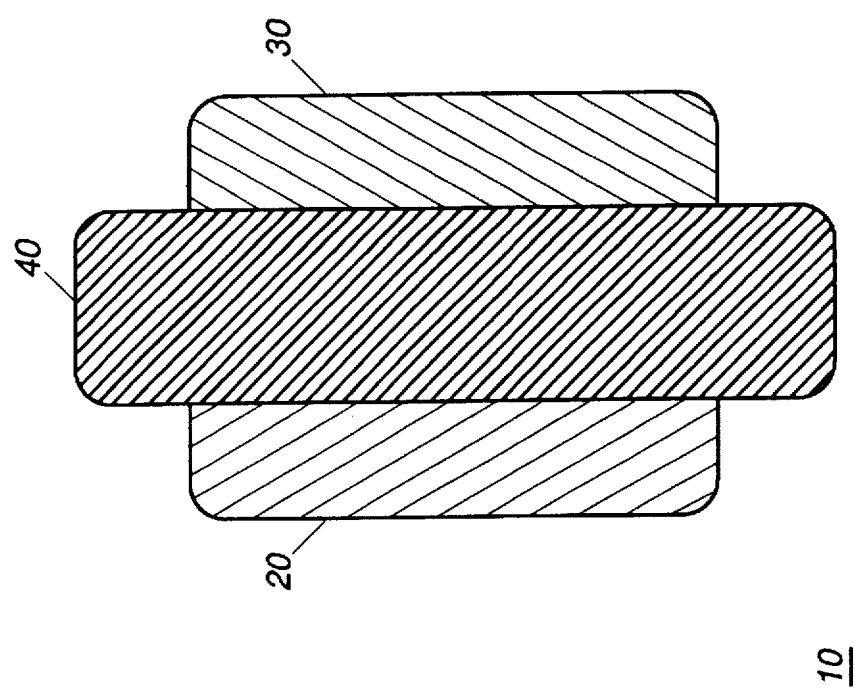
FIG. 1 is a schematic representation of an electrochemical cell including an electrode fabricated of the material disclosed in accordance with the instant patent application.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell 10 such as a battery or electrochemical capacitor including an electrode having an electrode material in accordance with the instant invention. The electrochemical cell 10 includes a positive electrode or cathode 20 and negative electrode or anode 30, and an electrolyte 40 disposed therebetween. The cell negative electrode or anode 30 is fabricated of a carbon or graphite type material such as that disclosed hereinabove. The cell cathode or positive electrode 20 includes at least the material in accordance with the instant invention, and may further include a lithiated transition metal oxide. The electrolyte 40 disposed between the electrodes may be any of the electrolytes known in the art such as, for example, non aqueous liquid electrolytes such as $LiPF_6$, $LiClO_4$, $LiBF_4$, and combinations thereof. Alternatively, the electrolyte may be a solid electrolyte consisting of a polymeric support structure having an electrolyte active species dispersed therein. In this regard, the electrolyte 40 may be comprised of, for example, polyethylene oxide (PEO) as the polymeric support structure, and lithium salt such as $LiClO_4$ dispersed therein as the electrolyte active species. In this embodiment, the electrolyte 40 may also act as a separator between the positive and negative electrodes. The electrolyte may also be alternatively an aqueous, non-aqueous, solid-state, gel or some combinations thereof. The electrodes and electrolytes are then enclosed in a package such as a cell case or polymer envelope.

In order to fabricate an electrochemical cell in which the cathode has an excess or a reservoir of lithium ions so as to overcome the irreversible loss experienced by the anode on the first cycle, it is necessary to provide the cathode material with an excess or reservoir of lithium ions. Traditional cathode material such as $LiMnO_2$, $LiCoO_2$, and $LiNiO_2$, do not possess this excess reservoir. Accordingly, the electrode must include a material which does. The cathode 20 should therefore include a "reservoir" materials such as $Li_2NiO_2$ or $Li_4Co_4O_6$, each of which have a large initial charge capacity with a reversible capacity comparable to existing materials such as $LiCoO_2$ and/or $LiMn_2O_4$. Accordingly, the cathode material comprises a mix of conventional electrode material such as $LiCoO_2$ or $LiMn_2O_4$, along with $Li_2NiO_2$ and/or $Li_4Co_4O_2$. In one preferred embodiment of the instant invention, $Li_4Co_4O_6$ and/or $Li_2NiO_2$ comprises between 10 and 100 wt. % of the cathode, and more preferably between 15 and 35 wt. % of the cathode.

$Li_2NiO_2$ may be synthesized by high temperature reaction in an inert gas environment. As used herein, inert gas environment refers to helium, nitrogen, and/or argon gas environments. Precursor materials which may be used in the fabrication process include, for example, $Ni(OH)_2$, Ni powder, or NiO, and LiOH. When $Ni(OH)_2$ and LiOH are used, the following overall reaction may occur at an elevated temperature, i.e., at temperatures above about 450° C.:

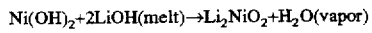

Similarly, if NiO and LiOH are used as the starting materials, the following reaction may occur:

Although other nickel and lithium salts may be used as starting materials, the materials described above are preferred since the product is the desired end material. Other salts such as the carbonate or nitrate salts may be used, however, $Li_2CO_3$, for example, may be formed. This material would not decompose at temperatures below about 700° C., or alternatively, $Ni^{2+}$ ions may be oxidized to a high valence to form stable phases such as $Li_2Ni_8O_{10}$.

The reaction described above occurs at a reasonable rate at a temperature above about 500° C. Therefore, a reaction temperature higher than 500° C. is preferred but should be controlled to less than about 850° C. as the product may be decomposed into $Li_2O$ and NiO at higher temperatures. The instant invention maybe better understood from the examples which follow.

EXAMPLE

Figure 2:
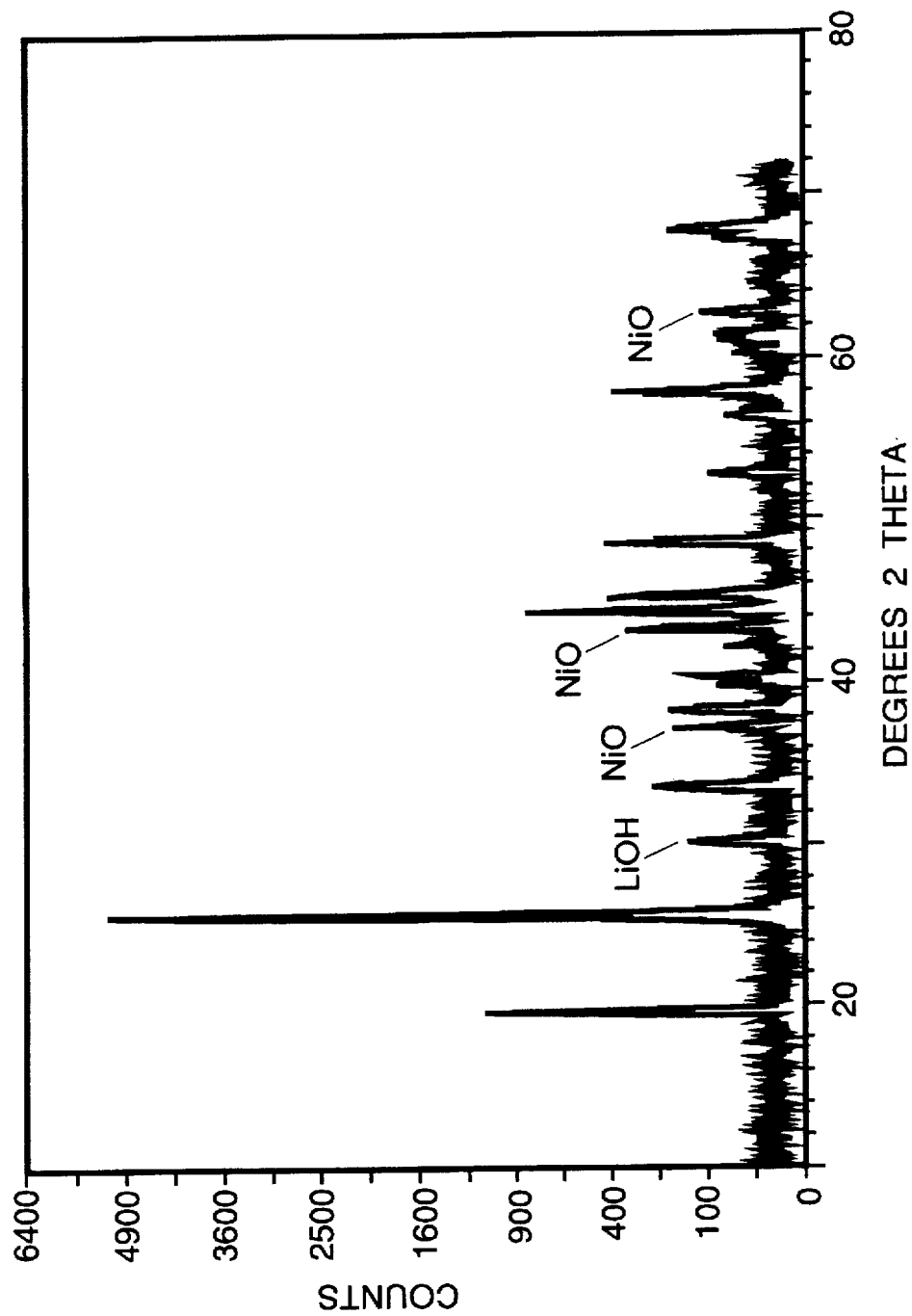
FIG. 2 is the X-ray diffraction pattern of the electrode material in accordance with the instant invention.

LiOH was mixed with Ni(OH) in a molar ratio of 2.15 to 1, via conventional mixing. The mixture was heated to 450° C. in a nitrogen atmosphere for 12 hours. Thereafter, materials were ground and heated at 650° C. in nitrogen atmosphere for approximately 50 hours with two intermittent grinding processes. The final product was dark green and demonstrated the X-ray diffraction pattern (XRD) illustrated in FIG. 2., when $CuαK_1$ is used as the X-ray source. The XRD analysis plots degrees 2 theta on the abscissa and intensity on the ordinate. Although there is some unreacted NiO and LiOH in the material so fabricated above, the main material $Li_2NiO_2$ can be defined by the XRD characteristic peaks at the angles as given in FIG. 2. Specifically, the XRD is characterized by a very intense peak at 26 degrees 2 theta, with a secondary peak at about 20 degrees 2 theta.

Test One

The $Li_2NiO_2$ fabricated in the above Example was tested as the positive electrode or cathode material of an electrochemical cell in which the $Li_2NiO_2$ material comprises essentially 100% of the active material in the cathode. The negative electrode material employed was lithium foil, while the electrolyte was 1M $LiPF_6$ is 50% ethylene carbonate (EC) and 50% diethylene carbonate (DEC), and a glass mat separator.

Figure 3:
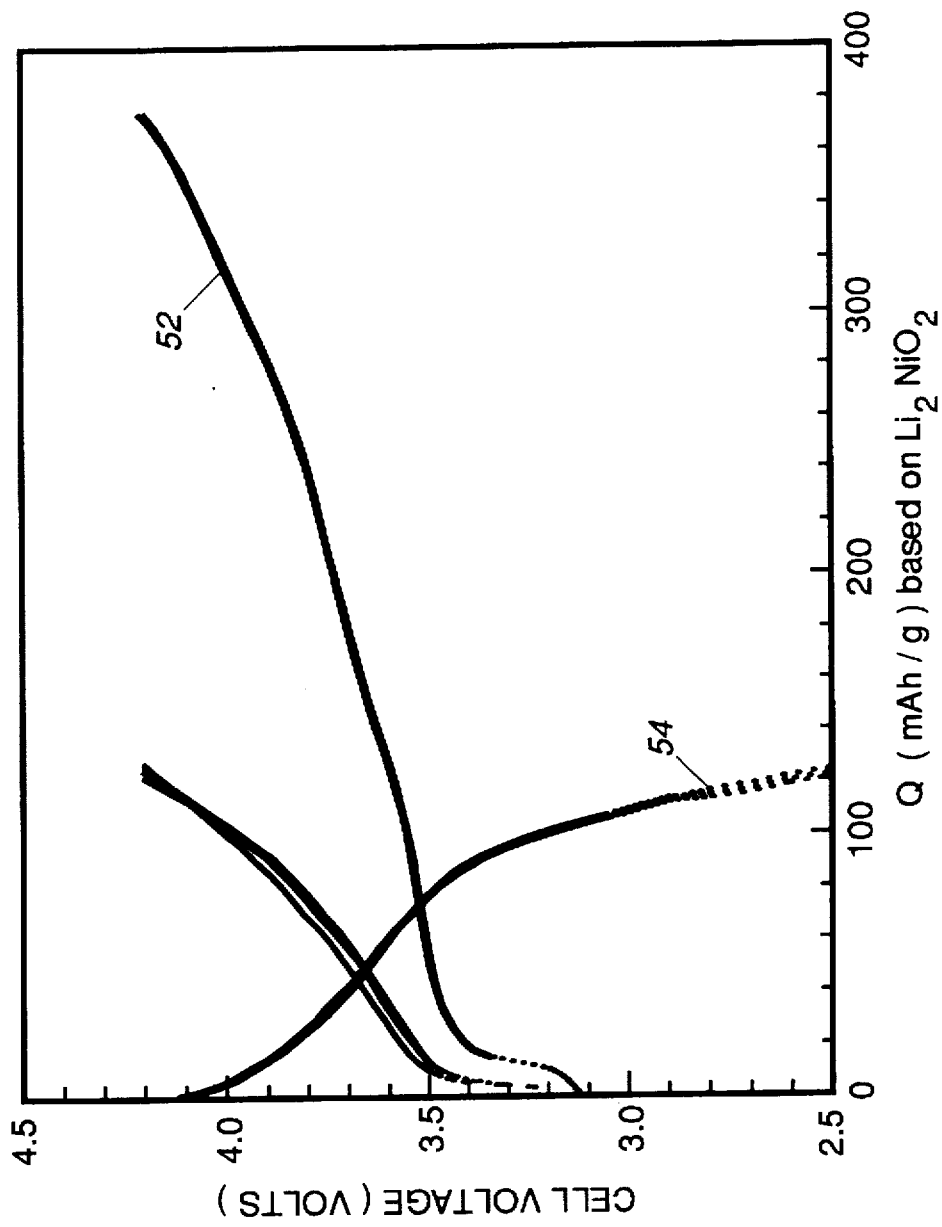
FIG. 3 is the charge and discharge profile of cell voltage for the first ten cycles of an electrochemical cell employing an electrode material in accordance with the instant invention.

Referring now to FIG. 3, there is illustrated therein the charge and discharge profiles of an electrochemical cell employing $Li_2NiO_2$ as the cathode material therein. A perusal of FIG. 3 will show that the initial charge capacity of the $Li_2NiO_2$ material is 376 mAh/g (line 52), and the discharge capacity is approximately 123 mAh/g (line 54). The initial charge capacity is much larger than in conventional cathode materials, such as $LiCoO_2$ and $LiMn_2O_4$. The material thus possesses the built-in reservoir of Li-ions necessary to overcome dramatic irreversible capacity loss. The discharge capacity is also comparable with conventional $LiCoO_2$ and $LiMn_2O_4$ materials. After the first cycle, the charge and discharge curves became nearly symmetric, and remain substantially the same from one cycle to another. Thus, it may be inferred that the capacity of this material is quite stable.

Test Two

The $Li_2NiO_2$ material fabricated as described hereinabove was mixed with conventional $LiCoO_2$ material to form a positive electrode for an electrochemical cell. The composite electrode comprised 20 wt. % of $Li_2NiO_2$ and 80 wt. % of $LiCoO_2$. Lithium foil was used as the negative electrode in the cell. The electrolyte was as in Test One.

Figure 4:
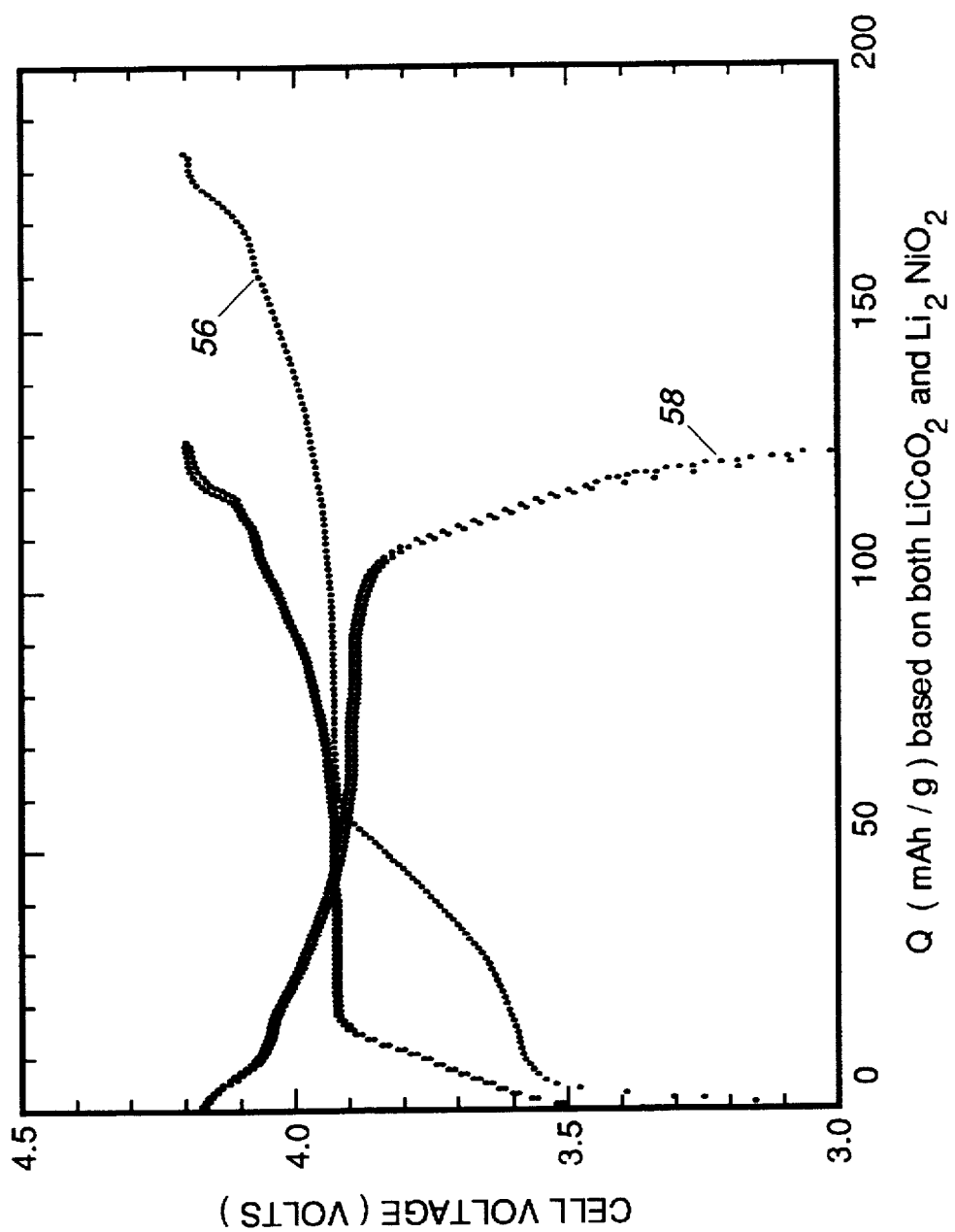
FIG. 4 is the charge and discharge profile of an electrochemical cell for the first twenty cycles, employing an electrode material in accordance with the instant invention.

Referring now to FIG. 4, there is illustrated therein the charge and discharge profiles for the electrochemical cell described in this Test Two. The initial charge capacity of this cell was approximately 190 mAh/g (line 56), based on the total positive material versus about 130 mAh/g for conventional $LiCoO_2$. Thus, the composite material provides an additional 60 mAh/g capacity on charging. The discharge capacity was approximately 120 mAh/g, (line 58), which is comparable to convention materials. A perusal of FIG. 4 shows that after the first cycle the capacity of the cells was quite stable.

Test Three

A composite positive electrode such as that described hereinabove with respect to Test Two was paired with graphite as a negative electrode, and the electrolyte of Test One.

Figure 5:
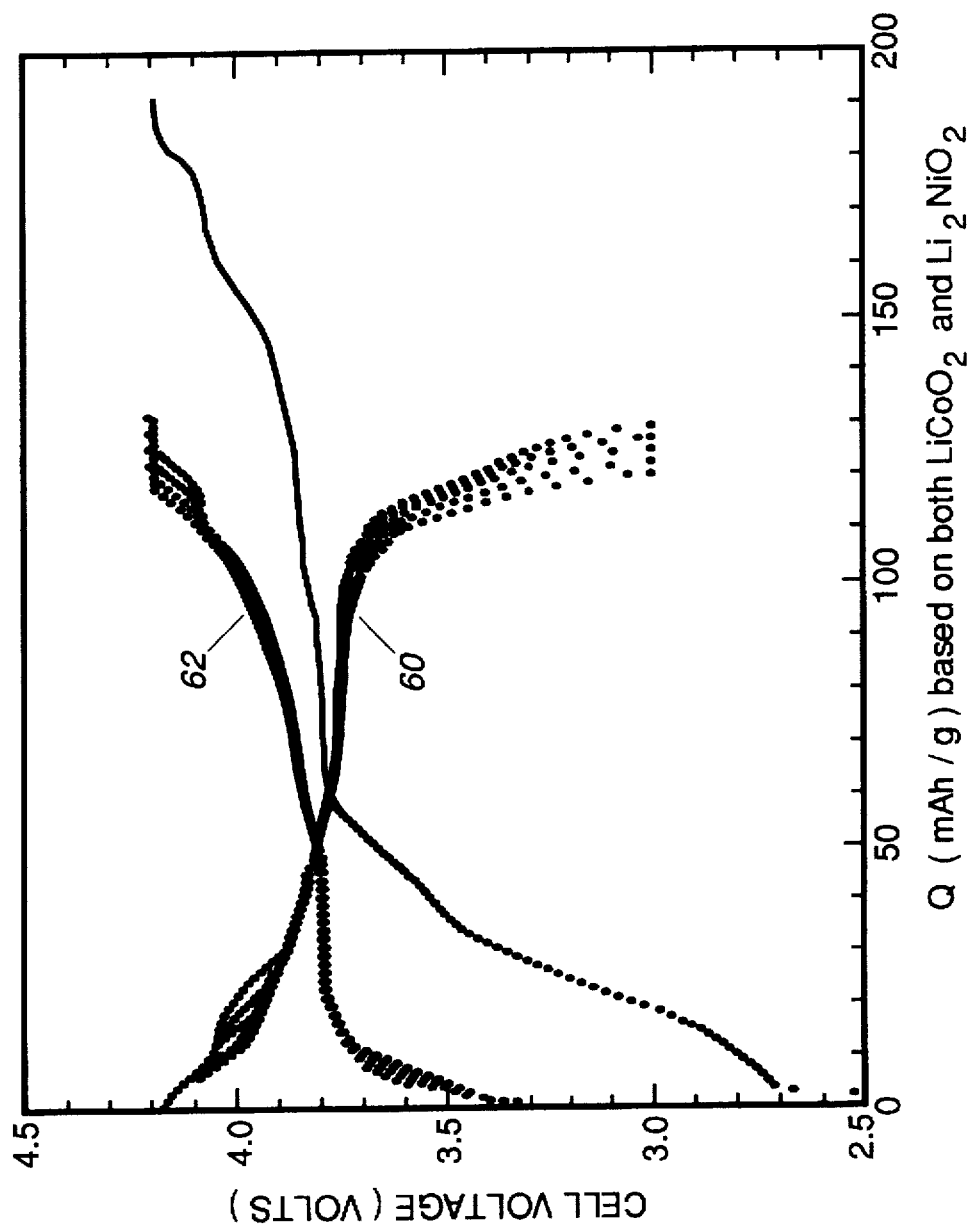
FIG. 5 is the charge and discharge profiles of an electrochemical cell for the first ten cycles employing an electrode incorporating an electrode material, in accordance with the instant.

Referring now to FIG. 5, there is illustrated therein the charge and discharge profiles of the electrochemical cell according to this Test Three. FIG. 5 illustrates that for the test cell, a capacity of 120 mAh/g was obtained based upon the total composite positive materials as shown by lines 60 and 62. As may also be appreciated from FIG. 5, the capacity of the cell is quite stable.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for a rechargeable electrochemical cell, said electrode comprising a first electrode material having the formula $Li_2NiO_2$ and a second electrode material having the formula $LiNiO_2$, wherein the $Li_2NiO_2$ and the $LiNiO_2$ have been synthesized in separate reactions then physically mixed to form an electrode active material.

2. An electrode as in claim 1, wherein said first electrode material comprises between 10 and 50 wt % of the electrode.

3. An electrode as in claim 1, wherein said first electrode material comprises between 15 and 35 wt. % of the electrode.

4. The electrode of claim 1, wherein the electrode includes a physical mixture comprising discrete particles of $Li_2NiO_2$ and $LiNiO_2$.

5. The electrode of claim 1, wherein the $Li_2NiO_2$ is synthesized in a high temperature reaction in an inert environment from precursor materials consisting of $Ni(OH)_2$ and 2LiOH.

6. The electrode of claim 1, wherein the $Li_2NiO_2$ is synthesized in a high temperature reaction in an inert environment from precursor materials consisting of NiO and 2LiOH.

7. An electrochemical cell, comprising:

a first electrode comprising a first electrode material having the formula $Li_2NiO_2$ and a second electrode material having the formula LiNiO2, wherein the $Li_2NiO_2$ and the $LiNiO_2$ have been synthesized in separate reactions then physically mixed to form an electrode active material;

a second electrode comprising a third electrode material; and an electrolyte disposed between the first and second electrodes.

8. The electrochemical cell of claim 7, wherein said first electrode material comprises between 10 and 50 wt. % of the electrode.

9. The electrochemical cell of claim 7, wherein said first electrode material comprises between 15 and 35 wt. % of the electrode.

10. The electrochemical cell of claim 7, wherein the first electrode includes a physical mixture comprising discrete particles of $Li_2NiO_2$ and $LiNiO_2$.

11. The electrochemical cell of claim 7, wherein the $Li_2NiO_2$ is synthesized in a high temperature reaction in an inert environment from precursor materials consisting of $Ni(OH)_2$ and 2LiOH.

12. The electrochemical cell of claim 7, wherein the $Li_2NiO_2$ is synthesized in a high temperature reaction in an inert environment from precursor materials consisting of NiO and 2LiOH.

13. A method for forming an electrochemical cell, the method comprising the steps of:

synthesizing $Li_2NiO_2$;

synthesizing $LiNiO_2$;

mixing, subsequent to the synthesizing steps, the $Li_2NiO_2$ and the $LiNiO_2$ to form a physical mixture of electrode active material;

fabricating, subsequent to the mixing step, an electrode to include the physical mixture of the electrode active material; and forming the electrochemical cell comprising the electrode.

* * * * *